(12) United States Patent
Koszek

(10) Patent No.: US 10,841,096 B2
(45) Date of Patent: Nov. 17, 2020

(54) ENCRYPTED SELF-IDENTIFICATION USING A PROXY SERVER

(71) Applicant: salesforce.com, inc., San Francisco, CA (US)

(72) Inventor: Wojciech Koszek, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 202 days.

(21) Appl. No.: 15/724,034

(22) Filed: Oct. 3, 2017

(65) Prior Publication Data

US 2019/0103970 A1 Apr. 4, 2019

(51) Int. Cl.
*H04L 9/32* (2006.01)
*H04L 29/06* (2006.01)
*H04L 9/14* (2006.01)
*H04L 29/08* (2006.01)
*H04L 9/08* (2006.01)

(52) U.S. Cl.
CPC .......... *H04L 9/3226* (2013.01); *H04L 9/0866* (2013.01); *H04L 9/0891* (2013.01); *H04L 9/14* (2013.01); *H04L 9/321* (2013.01); *H04L 9/3297* (2013.01); *H04L 63/0281* (2013.01); *H04L 63/0428* (2013.01); *H04L 67/141* (2013.01); *H04L 67/28* (2013.01); *H04L 63/166* (2013.01); *H04L 67/02* (2013.01); *H04L 67/10* (2013.01); *H04L 2209/76* (2013.01)

(58) Field of Classification Search
CPC ..... H04L 9/3226; H04L 9/14; H04L 63/0281; H04L 63/166; H04L 63/0428; H04L 67/28; H04L 67/141; H04L 67/02; H04L 67/10
USPC .......................................................... 713/168
See application file for complete search history.

(56) References Cited

U.S. PATENT DOCUMENTS

| 2007/0133803 | A1* | 6/2007 | Saito | H04L 29/12009 380/267 |
| 2009/0119504 | A1* | 5/2009 | van Os | H04L 9/3271 713/153 |
| 2011/0231649 | A1* | 9/2011 | Bollay | H04L 63/166 713/151 |
| 2012/0076293 | A1* | 3/2012 | Smith | H04L 9/0637 380/28 |
| 2013/0024688 | A1* | 1/2013 | Wen | H04L 63/0807 713/168 |

(Continued)

*Primary Examiner* — Fatoumata Traore
*Assistant Examiner* — Kevin Ayala
(74) *Attorney, Agent, or Firm* — Holland & Hart LLP

(57) ABSTRACT

Some database systems may implement encrypted connections to improve the security of incoming server traffic. The systems may implement the encrypted connections using encryption keys known to both a proxy server and a server (e.g., a database server). For example, a proxy server may encrypt one or more communications between the proxy server and a user device, such as self-identifying information for the user device, using a known encryption key. The user device may, in turn, attempt to establish an encrypted connection with the server using the encrypted communications. Because the encryption key is known to both the server and the proxy server, the server may decrypt the encrypted communications and subsequently establish an encrypted connection with the user device based on the decrypted communications.

19 Claims, 13 Drawing Sheets

(56) References Cited

U.S. PATENT DOCUMENTS

| | | | |
|---|---|---|---|
| 2013/0315391 A1* | 11/2013 | Yao | H04L 63/0428 |
| | | | 380/255 |
| 2014/0351573 A1* | 11/2014 | Martini | H04L 63/0428 |
| | | | 713/153 |
| 2015/0074396 A1* | 3/2015 | Naslund | H04L 63/0807 |
| | | | 713/168 |
| 2016/0050070 A1* | 2/2016 | Bohli | H04L 9/0819 |
| | | | 713/168 |

* cited by examiner

ENCRYPTED SELF-IDENTIFICATION USING A PROXY SERVER

FIELD OF TECHNOLOGY

The present disclosure relates generally to database systems and data processing, and more specifically to encrypted self-identification using a proxy server.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, encrypted connections may exist within the cloud platform. For example, encrypted connections may exist between one or more user devices and a server. However, certain information system protocols (e.g., Hypertext Transfer Protocol (HTTP)) may prevent server operators from credibly discerning the originator of server traffic. Stated alternatively, server operators cannot reliably determine an Internet Protocol (IP) address or similar origination information of incoming traffic, which may adversely impact security and performance measures of the server.

DETAILED DESCRIPTION

Figure 1:
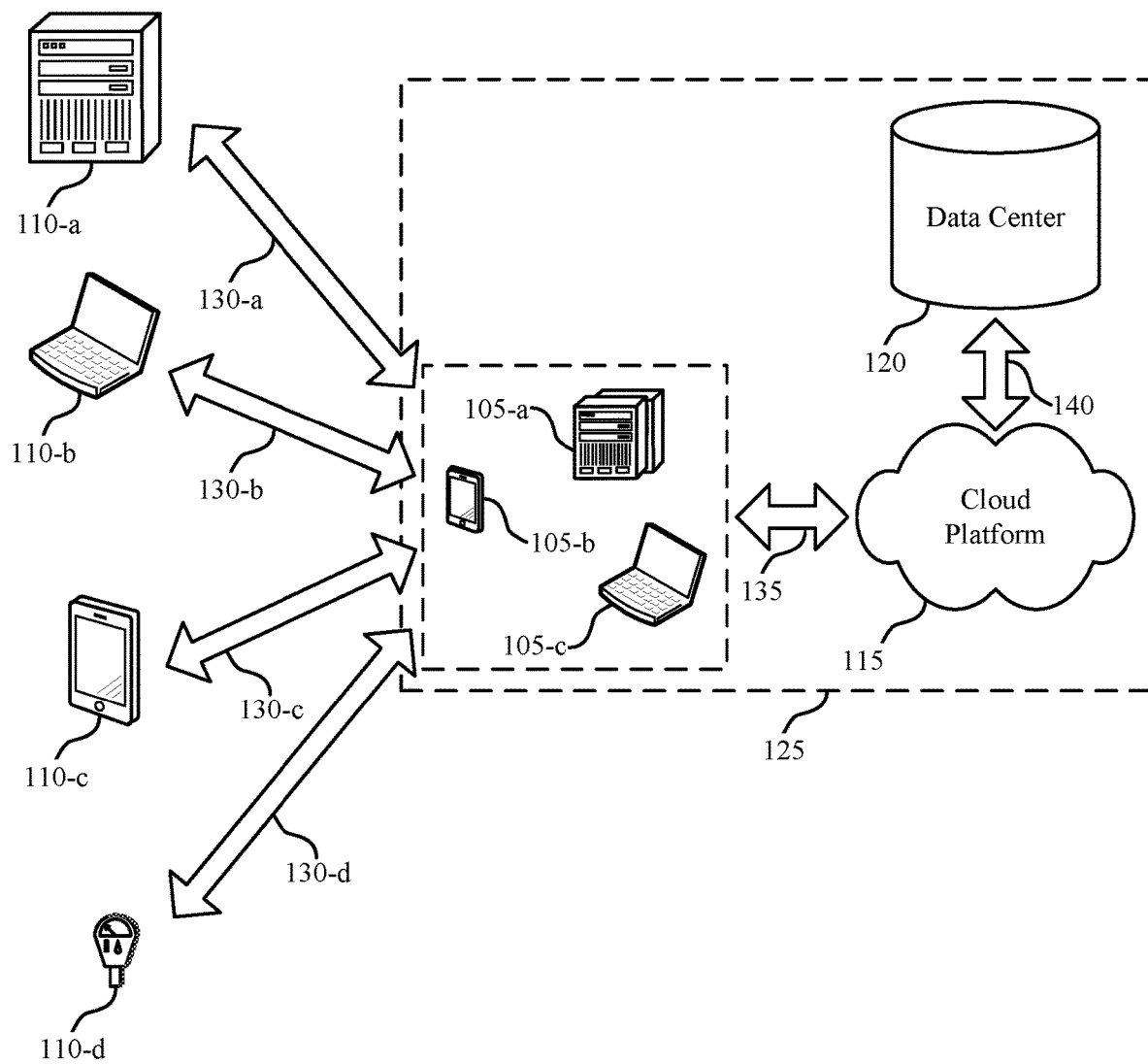
FIGS. 1 through 5 illustrate examples of systems for establishing encrypted connections that support encrypted self-identification using a proxy server in accordance with aspects of the present disclosure.

Encrypted connections may exist between user devices and servers using HTTP or other protocols. However, some commonly-used protocols and server architectures may result in server operators being unable to discern the origin of incoming traffic. For example, encrypted traffic may be sent from a user device to a blind proxy, which then forwards the encrypted data to the target server. However, origination information of the encrypted data (e.g., an IP address associated with the user device) may be lost during this forwarding process. In order to establish an encrypted connection where the origin of incoming traffic is known, a proxy server may be implemented. By utilizing an encryption key known to both the proxy server and a server to which a user device is attempting to establish a connection, a more reliable and trusted encrypted connection may be established.

In a first example, an encrypted connection may be reliably established between a user device and a server by using an intermediate proxy server. A user device may transmit one or more messages to a proxy server that corresponds to self-identifying information of the user device. For example, the user device may provide its IP address, a Transmission Control Protocol (TCP), or other communication protocol to the proxy server. In return, this self-identifying information may be returned to the user device in encrypted form, using an encryption key known by the proxy server and by an associated server (e.g., a database server), but unknown to the user device. Upon receiving the encrypted message, the user device may establish an encrypted connection with the associated server. For example, the user device may transmit, to the server, a connection request message including the encrypted message. The server may receive the connection request message, and may decrypt and determine the self-identifying information for the user device using the encryption key known to both the server and the proxy server. The user device and server may then communicate with each other, with the server operator being able to discern the originator (e.g., the IP address of the user device) of the connection request.

In another example, an encrypted connection may be reliably established between a server and a user device using an intermediate proxy server. The proxy server may receive one or more messages corresponding to self-identifying information of the user device. For example, and as similarly discussed above, the user device may provide its IP address, a TCP, or other communication protocol. In return, the proxy server may encrypt the self-identifying information and transmit the information to the user device in the form of an encrypted message. The encrypted message, in turn, may be received by the server in a connection procedure initiated by the user device. The server may decrypt the encrypted message, as the encryption key is known by it and the proxy server, and may not be known by the user device. As described above, the user device and the server may then communicate with each other, again with the server being able to discern identification information for the user device.

The system described above may support various user devices, multiple proxy servers, and may utilize numerous encryption keys. For example, different proxy servers may each utilize different encryption keys. Additionally or alternatively, in multi-tenant database systems, one or more proxy servers may include tenant-specific encryption keys. The system may also include mechanisms to re-generate encryption keys based on changes in the user device's identifying information. In some cases, the system may include a second layer of encryption for additional security, wherein the user device may transmit a second encrypted message to the server prior to establishing an encrypted connection between the two devices.

Aspects of the disclosure are initially described in the context of a system supporting an on-demand database service. Further aspects of the disclosure are described with respect to systems for establishing an encrypted connection, such as between a user device and a server or between a server and a user device. Aspects of the disclosure are further illustrated by and described with reference to apparatus diagrams, system diagrams, and flowcharts that relate to encrypted self-identification using a proxy server.

FIG. 1 illustrates an example of a system 100 for cloud computing that supports encrypted self-identification using a proxy server in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The cloud clients 105 of subsystem 125 may be examples of one or more user devices and data center 120 may be an example of or include, as a component, a server to which a cloud client 105 may attempt to establish an encrypted connection with. For example, cloud client 105 may utilize network connection 135 to transmit a query message to a proxy server (not shown), which may be a component of cloud platform 115 or data center 120. In some examples, the query message may include identification information of the cloud client 105 (e.g., the device's IP address). The cloud client 105 may, in return, receive an encrypted message that includes ciphertext corresponding to its identification information. In some examples, the encryption message may utilize an encryption key known only to the proxy server and to the data center 120.

Upon receiving the encrypted message, cloud client 105 may transmit the encrypted message, via network connection 135, to the data center 120. Subsequently, for example, an encrypted connection may be established between the cloud client 105 and the data center 120 based at least in part on the identification information of the cloud client.

In another example, a proxy server (not shown) may receive a query message from the cloud client 105. In some examples, the query message may include identification information of the cloud client 105 (e.g., a TCP). The proxy server may generate an encrypted message using an encryption key known to only the proxy server and the data center 120. For example, servers of the data center 120, including proxy servers, database servers, or any other types of servers, may include indications of the encryption key. In some examples, the encrypted message may contain ciphertext corresponding to the identification information of the cloud client 105. Subsequently, for example, proxy server may transmit the encrypted message to the cloud client 105. The encrypted message may then be received, for example at a later time, by data center 120. Because the encryption key is known to the data center 120, in addition to the proxy server, the data center 120 may decrypt the encrypted message and an encrypted connection may be established between the cloud client 105 and the data center 120 or a server of the data center. In either example, the system may support various cloud clients 105, multiple proxy servers, and may utilize numerous encryption keys.

Figure 2:
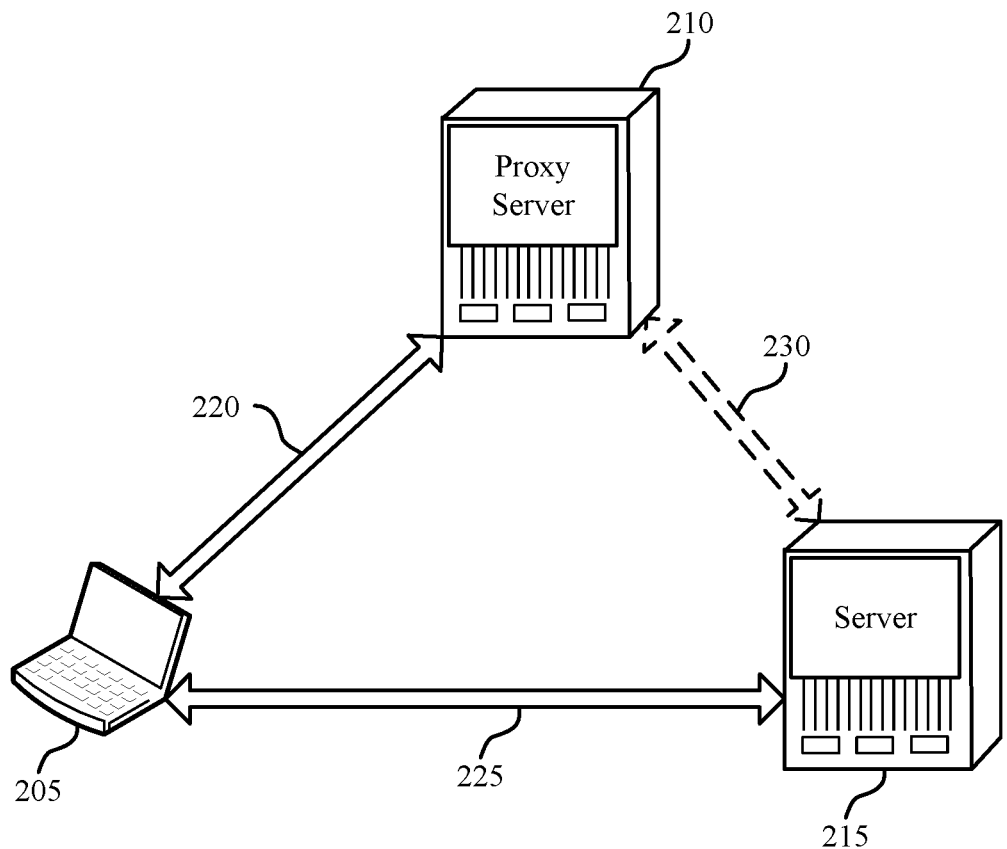

FIG. 2 illustrates an example of a system 200 for establishing an encrypted connection that supports encrypted self-identification using a proxy server in accordance with various aspects of the present disclosure. The system 200 may include a user device 205, which may be an example of a cloud client 105 as described with reference to FIG. 1; a proxy server 210; and a server 215, which may be an example of the data center 120 as described with reference to FIG. 1. In some cases, the proxy server 210 and the server 215 may be examples of components of a data center 120, a cloud platform 115, or some combination of these, as described with reference to FIG. 1. Additionally or alternatively, for example, the system 200 may include one or more connections—for example, connection 220, connection 225, and connection 230.

In some examples, the user device 205 may establish an encrypted connection with the server 210 by way of proxy server 210. For example, the user device 205 may initiate a communication with proxy server 210 through connection 220. In some examples, the user device 205 may transmit one or more messages to the proxy server 210. The messages may include identification information of the user device 205 such as, for example, the user device's IP address or a TCP. Identification information of the user device 205 may ultimately aid the server 215 in identifying incoming traffic.

Upon transmitting the identification information to the proxy server 210 via connection 220, the information may be received at the proxy server 210. In some examples, the proxy server 210 may encrypt the received message (e.g., the identification information) using an encryption key known to the proxy server 210 and to the server 215. In some examples, the proxy server 210 and the server 215 may be connected via connection 230. Additionally or alternatively, for example, both proxy server 210 and server 215 may be managed by a common system administrator, may be owned or operated by the same entity, or may otherwise by jointly controlled. Thus the common system administrator may be able to assign a same encryption key to both the proxy server 210 and the server 215. In other examples, the proxy server 210 may generate an encrypted message containing ciphertext corresponding to the identification information of the user device 205. Subsequently, for example, the encrypted message may be transmitted from the proxy server 210 back to the user device 205. This message may be transmitted via connection 220.

Upon receiving the encrypted message, the content of the encrypted message may be unknown to user device 205. For example, the user device 205 may not have access to—or include an indication of—the encryption key used to encrypt the message. The technique of using identification information of the user device 205 and encrypting the information such that the user device 205 cannot read or alter it, may help prevent attempts to connect with the server 215 using false origination information. In some cases, the proxy server 210 may include unencrypted information along with the encrypted message that alerts the user device 205 to transmit the encrypted message to the server 215. Despite not knowing the content of the encrypted message, the user device 205 may transmit the encrypted message to server 215 via connection 225. Because the message was encrypted using an encryption key known to both the proxy server 210 and the server 215, server 215 may be capable of decrypting the received, encrypted message. Based on decrypting the message, the server 215 may identify the user device 205 as the originator of the message. This decryption may result in an encrypted connection being established between the user device 205 and the server 215.

Figure 3:
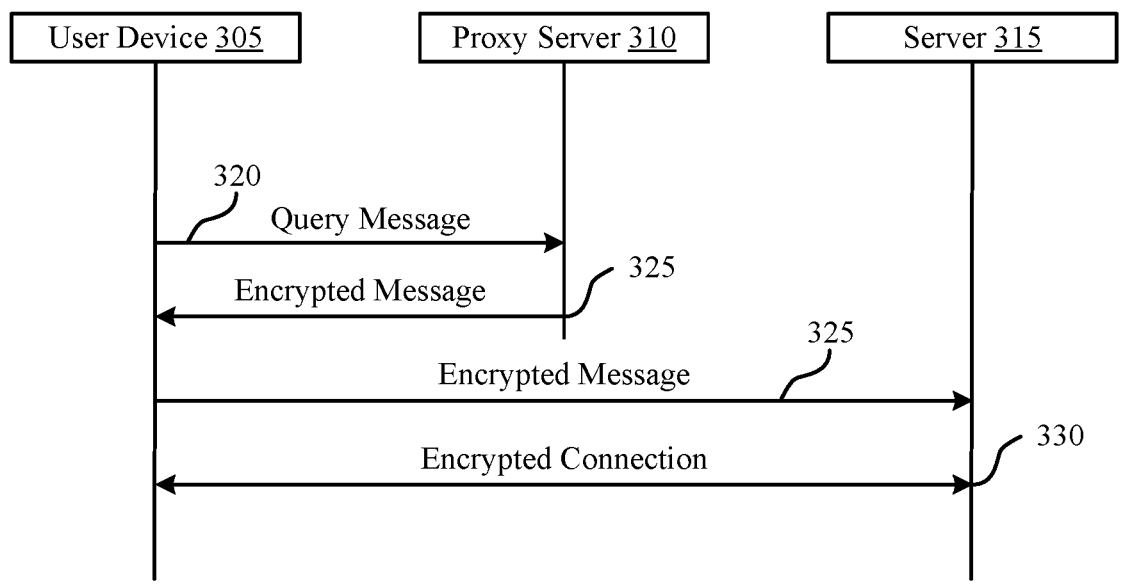

FIG. 3 illustrates an example of a system 300 for establishing an encrypted connection that supports encrypted self-identification using a proxy server in accordance with various aspects of the present disclosure. The system 300 may include a user device 305, which may be an example of user device 205 as described with reference to FIG. 2; proxy server 310, which may be an example of proxy server 210 as described with reference to FIG. 2; and server 315, which may be an example of server 215 as described with reference to FIG. 2. Additionally or alternatively, for example, the system 300 may include query message 320, encrypted message 325, and encrypted connection 330.

System 300 may be an example of establishing an encrypted connection 335 between user device 305 and server 315. In some examples, the user device 305 may establish an encrypted connection with server 315 by way of proxy server 310. For example, the user device 305 may initiate the connection process by first transmitting the query message 320 to the proxy server 310. The query message may include identification information of the user device 305. As described above with reference to FIG. 2, the identification information of the user device 305 may include an IP address, a TCP, or both. Additionally or alternatively, for example, the query message may include a cryptographic nonce, a timestamp, or both. Alternatively, the proxy server 310 may determine or generate a cryptographic nonce, a timestamp, or both. Any or all of this information may be used, for example, in determining whether the query message 320 was modified or in an encryption process.

After transmitting query message 320, the user device may receive an encrypted message 325 from the proxy server 310. The encrypted message may, for example, include the identification information of the user device 305. However, the identification information of the user device 305 may be encrypted using an encryption key known only to the proxy server 310 and the server 315. Because the encryption key is not known to the user device 305, the user device 305 may be unable to determine the content of encrypted message 325.

Subsequently, for example, the user device may transmit the encrypted message 325 to the server 315. Because the encryption key is known to both the proxy server 310, which used the key to encrypt encrypted message 325, and to the server 315, the server 315 may be able to decrypt the encrypted message 325. In some examples, the transmission of the encrypted message 325 may include transmitting a connection request message (not shown) from the user device 305 to the server 315. In some examples, the connection request message may include the encrypted message 325 located in a header of the connection request message. Additionally or alternatively, for example, the connection request message may include a HTTP request message.

In other examples, the connection request message may be encrypted to add an additional layer of security. In some cases, the encrypted message 325 and the encrypted connection request message may be encrypted using different encryption keys. For example, the encrypted message 325 may be encrypted using a first encryption key known to the proxy server 310 and the server 315 (but not the user device 305), and the connection request message may be encrypted using a second encryption key known to the user device 305 and the server 315 (and, optionally, the proxy server 310). Accordingly, each encryption key may be known by the server 315, which may ultimately result in the establishment of encrypted connection 330 between the user device 305 and the server 315. Stated alternatively, the encrypted connection 330 may be established based at least in part on the decryption of the encrypted message 325, by the server 315, using the encryption key.

In another example, system 300 may be an example of establishing an encrypted connection 335 between the server 315 and the user device 305. In some examples, the encrypted connection 330 may be established by way of the proxy server 310. For example, the proxy server 310 may receive the query message 320 from the user device 305. As described above, the query message may include identification information of the user device 305. Also described above, with reference to FIG. 2, the identification information of the user device 305 may include an IP address, a TCP, or other communication protocol. Additionally or alternatively, for example, the query message may be received by the proxy server 310 based at least in part on the user identification being a known characteristic. For example, a specific IP address (or IP addresses) may be authorized for access to the server 315. In such an example, the authorized IP address may be provided to the proxy server 310, which may then be able to receive the query message 320 based at least in part on the IP address being known.

After receiving the query message 320, the proxy server 310 may generate an encrypted message 325. The encrypted message 325 may, for example, include the identification information of the user device 305 that was included in the query message 320. The identification information of the user device 305 may be encrypted using an encryption key known only to the proxy server 310 and the server 315. The encryption key may be assigned, for example, by a system administrator common to both the proxy server 310 and the server 315. In some cases, the encryption key may be generated based on one or more secrets (e.g., tenant-specific secrets, master secrets, etc.), one or more salts, or some combination of these. To generate the encrypted message 325, the proxy server 310 may use the encryption key, a cryptographic nonce, a timestamp, or some combination of these parameters.

Subsequently, for example, the proxy server 310 may transmit the encrypted message 325 to the user device 305 and, in turn, the server 315 may receive the encrypted message 325. Because the encryption key is known to both the proxy server 310, which used the key to encrypt encrypted message 325, and to the server 315, the server 315 may be able to decrypt the encrypted message 325 using the encryption key. In some examples, the server 315 may be able to determine whether the query message 320 was modified between the user device 305 and the proxy server 310. For example, a malicious user may attempt to intercept the query message 320 to gain access to the server 315. However, the generation of the encrypted message 325 may be based at least in part on the determination of whether the query message 320 was modified. In some examples, it may be determined whether the query message 320 was modified based on the cryptographic nonce or the timestamp assigned to the query message 320. Thus, system 300 may prevent an unauthorized user from accessing the server 315.

Figure 4:
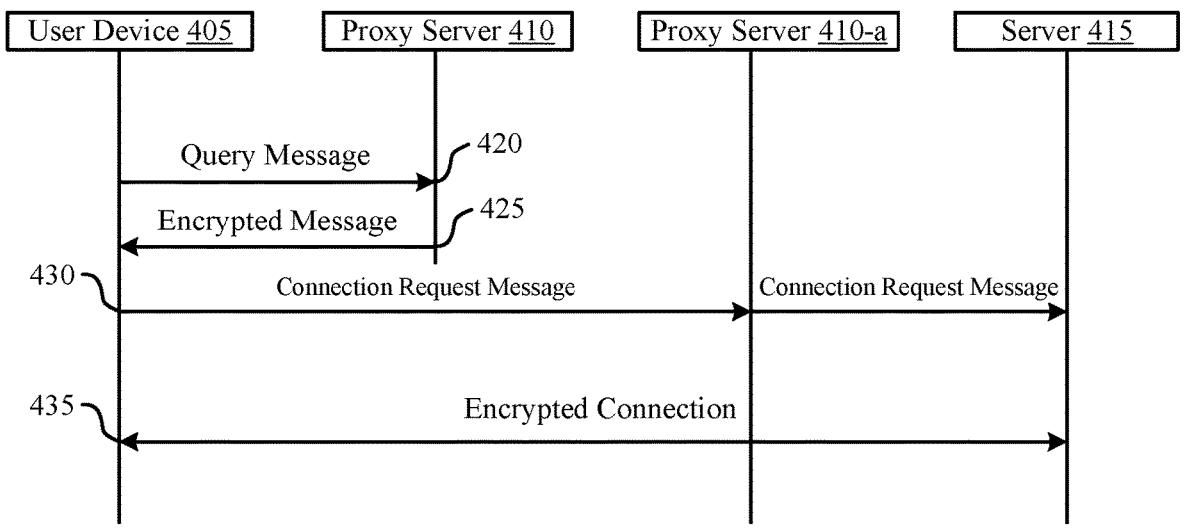

FIG. 4 illustrates an example of a system 400 for establishing an encrypted connection that supports encrypted self-identification using a proxy server in accordance with various aspects of the present disclosure. The system 400 may include a user device 405, which may be an example of user device 205 or 305 as described with reference to FIGS. 2 and 3; proxy server 410 and proxy server 410-*a*, which may be examples of proxy server 210 or 310 as described with reference to FIGS. 2 and 3; and server 415, which may be an example of server 215 or 315 as described with reference to FIGS. 2 and 3. Additionally or alternatively, for example, the system 400 may include query message 420, which may be an example of query message 320 as described with reference to FIG. 3; encrypted message 425, which may be an example of encrypted message 325 as described with reference to FIG. 3; connection request message 430; and encrypted connection 435, which may be an example of encrypted connection 335 as described with reference to FIG. 3.

System 400 may be an example of establishing an encrypted connection 435 between user device 405 and server 415. In some examples, the user device 405 may establish an encrypted connection with server 415 by way of proxy server 410, similar to the establishment of an encrypted connection 335 as described above with reference to FIG. 3. For example, the user device 405 may first transmit the query message 420 to the proxy server 410. The query message may include identification information of the user device 405. After transmitting query message 420, the user device may receive an encrypted message 425 from the proxy server 410. The encrypted message may, for example, include the identification information of the user device 405 in an encrypted form.

Subsequently, for example, the user device 405 may transmit a connection request message 430 to the server 415 by way of proxy server 410-*a*. For example, the connection request message 430 may be an encrypted or unencrypted message that includes the encrypted message 425. By encrypting the connection request message 430, an additional layer of security may be added to the establishment of encrypted connection 435. In some examples, the connection request message 430 may include the encrypted message located in a header of the connection request message 430. Additionally or alternatively, for example, the encrypted message and the encrypted connection request message 430 may be encrypted using different encryption keys. However, each encryption key may be known by the server 415, which may ultimately result in the establishment of encrypted connection 435 between the user device 405 and the server 415. Stated alternatively, the encrypted connection 435 may be established based at least in part on the decryption of the encrypted connection request message 430 and the encrypted message 425, by the server 415, using the encryption keys.

As mentioned above, the connection request message 430 may be transmitted to the server 415 by way of proxy server 410-*a*. For example, if proxy server 410-*a* is an example of a passive proxy, proxy server 410-*a* may serve to merely "pass along" the connection request message 430 to the server 415. Stated alternatively, proxy server 410-*a* may be unable to decipher the contents of the connection request message 430. Rather, the proxy server 410-*a* may only be able to facilitate the transfer of the connection request message 430 from the user device 405 to the server 415. In some examples, system 400 may include a plurality of proxy servers configured to facilitate the transfer of the connection request message from the user device 405 to the server 415 (e.g., in some cases, the proxy server 410 may intercept or transfer the connection request message 430 on its way to the server 415).

In other cases, proxy server 410-*a* may be an example of an active proxy. In such cases, proxy server 410-*a* may modify the contents of the connection request message 430. In some cases, proxy server 410-*a* may include an indication of the encryption key used to encrypt the connection request message 430, and may decrypt, read, or alter the information included in the connection request message 430. However, proxy server 410-*a* may not include the encryption key used to encrypt the encrypted message 425, and accordingly may not read or alter the encrypted message 425 contained in the connection request message 430. In some cases, based on a passive or active proxy intercepting or altering the connection request message 430, identifying information of the connection request message 430 may be updated. For example, an originator identifier of the connection request message 430 may be updated to indicate a proxy server 410-*a*. However, the server 415 may determine the originator of the connection request based on decrypting the encrypted message 425. In this way, encrypting the self-identification information for the user device 405 may allow a server 415 to determine the actual originator of a connection request message 430, even if the connection request message 430 is intercepted or modified by any number of proxy servers 410.

In some cases, a proxy server, such as a proxy server 410-*a*, may intercept the query message 420 when it is transmitted between the user device 405 and the proxy server 410. In such cases, the proxy server 410 may identify if the query message 420 is modified or corrupted in anyway. The proxy server 410 may not generate and return encrypted message 425 based on identifying that the query message 420 was intercepted on route. Instead, the user device 420 may not be able to proceed with the connection process, and instead may retransmit the query message 420 to the proxy server 410. When the proxy server 410 receives a query message 420 from the user device 405 that was not intercepted or modified by any proxy server 410-*a* or malicious application, the proxy server 410 may encrypt the query message 420 or the identification information for the user device 405, and may transmit the resulting encrypted message 425 in response. This process may ensure that the ciphertext contained in the encrypted message 425 accurately corresponds to the identification information for the user device 405.

Figure 5:
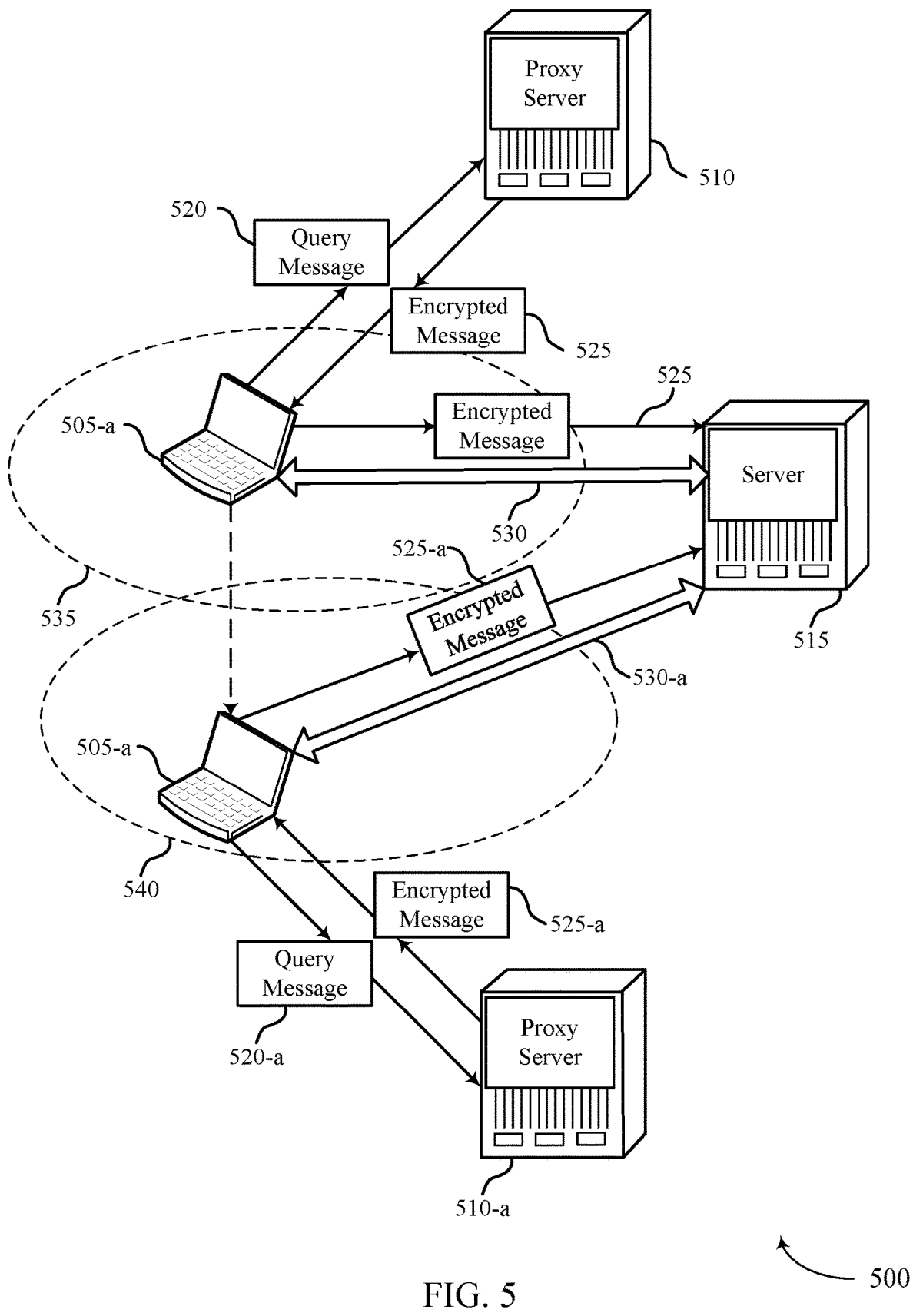

FIG. 5 illustrates an example of a system 500 for establishing an encrypted connection that supports encrypted self-identification using a proxy server in accordance with various aspects of the present disclosure. The system 500 may include user device 505-*a*, which may be an example of user device 205, 305, or 405 as described with reference to FIGS. 2 through 4; proxy server 510 and proxy server 510-*a*, which may be examples of proxy server 210, 310, or 410 as described with reference to FIGS. 2 through 4; and server 515, which may be an example of server 215, 315, or 415 as described with reference to FIGS. 2 through 4. Additionally or alternatively, for example, the system 500 may include query message 520 and query message 520-*a*, which may be examples of query message 320 or 420 as described with reference to FIGS. 3 and 4; encrypted message 525 and encrypted message 525-*a*, which may be examples of encrypted message 325 or 425 as described with reference to FIGS. 3 and 4; encrypted connection 530 and 530-*a*, which may be an example of encrypted connection 330 or 435 as described with reference to FIGS. 3 and 4; first location 535; and second location 540.

System 500 may be an example of re-establishing an encrypted connection 530-*a* between user device 505-*a* and a server 515. In some examples, the user device 505-*a* may be located at a first location 535 and may establish an encrypted connection 530 with server 515 by way of proxy server 510. For example, the user device 505-*a* may first transmit the query message 520 to the proxy server 510. The query message may include identification information of the user device 505-*a*. After transmitting query message 520, the user device 505-*a* may receive an encrypted message 525 from the proxy server 510. The encrypted message 525 may, for example, include the identification information of the user device 505-*a* in an encrypted form.

Subsequently, for example, the user device 505-*a* may transmit the encrypted message 525 to the server 515. Because the encryption key used by proxy server 510 to encrypt the encrypted message 525 is also known by the server 515, the server 515 may decrypt the encrypted message 525. Stated alternatively, the encrypted connection 530 may be established based at least in part on the decryption of the encrypted message 525, by the server 515, using the encryption key.

Despite an encrypted connection 530 being established between the user device 505-*a* and the server 515, one or more instances may occur that could terminate the encrypted connection 530. For example, the user device 505-*a* could lose power, change networks, or temporarily lose service. By way of example, user device 505-*a* located at second location 540 may represent the termination of encrypted connection 530 and the re-generation of the encrypted connection 530-*a*.

During the re-generation of the encrypted connection 530-*a*, the user device 505-*a* may first transmit the query message 520-*a* to the proxy server 510-*a*. Proxy server 510-*a* may be a same proxy server as proxy server 510, or may be a different proxy server. The query message 520-*a* may include identification information of the user device 505-*a*. In some examples, the identification information may include different identification information than included in query message 520. This may represent a change in, for example, the IP address of user device 505-*a*. After transmitting query message 520-*a*, the user device 505-*a* may receive an encrypted message 525-*a* from the proxy server 510-*a*. The encrypted message may, for example, include the identification information of the user device 505-*a* in an encrypted form. As stated above, this identification information may be different than or the same as the identification information included in query message 520.

Subsequently, for example, the user device 505-*a* may transmit the encrypted message 525-*a* to the server 515. Because the encryption key used by proxy server 510-*a* to encrypt the encrypted message 525-*a* is also known by the server 515, the server 515 may decrypt the encrypted message 525-*a*. The server 515 may be the same server 515 that the user device 505-*a* connected to when in first location 535, or may be a different server 515. The decryption of the encrypted message 525-*a* may result in the regeneration of the encrypted connection 530-*a*. In further examples that are not shown, a user device may re-establish a plurality of encrypted connections with a server subsequent to the termination of an existing encrypted connection. In such examples, each query message may contain same identification information as previous query messages or, alternatively, each query message may contain additional or different identification information.

In one example embodiment, the user device 505-*a* may establish an encrypted connection with server 515. To establish the connection, the user device 505-*a* may transmit a query message 520 that includes the IP address of the user device 505-*a*. Upon receiving the query message, including the IP address of the user device 505-*a*, the proxy server 510 may encrypt the message using an encryption key assigned by a system administrator common to both the proxy server 510 and the server 515. The user device 505-*a* may then receive the encrypted message 525, from the proxy server 515, and transmit the encrypted message 525 to the server 515. Because the encryption key is known to the server 515 (e.g., it was assigned by the system administrator), the server 515 may decrypt the encrypted message 525, which may establish an encrypted connection 530 between the user device 505-a and the server 515. In the case that the IP address of the user device 505-a changes, the user device 505-a may transmit a query message 520 (e.g., a second query message) to the proxy server 510 or 510-a that contains the new IP address. The proxy server may then encrypt the message using a same, known encryption key, and transmit the encrypted message 525 to the user device 505-a. The user device 505-a may then receive the encrypted message 525, from the proxy server 515, and transmit the encrypted message 525 to the server 515. Because the encryption key is known to the server 515, the server 515 may again decrypt the encrypted message 525, which may re-establish an encrypted connection 530 between the user device 505-a and the server 515.

In another example embodiment, the server 515 and one or more proxy servers 510 may undergo a key rotation process. For example, the server 515 may activate a new encryption key associated with the user device 505-a (e.g., based on a tenant of the user device 505-a, or some other feature of the user device 505-a). The server 515 may send an indication of the new active encryption key to one or more proxy server 510, for example, over an encrypted or secure connection. In some cases, the user device 505-a may perform a reconnection process to the server 515 based on the change in the encryption key. In other cases, if the user device 505-a performs a reconnection process (e.g., based on losing power, changing networks, temporarily losing service, moving to another location, etc.), a proxy server 510 or 510-a may use the new active encryption key to generate an encrypted message 525 based on a query message 520.

Figure 6:
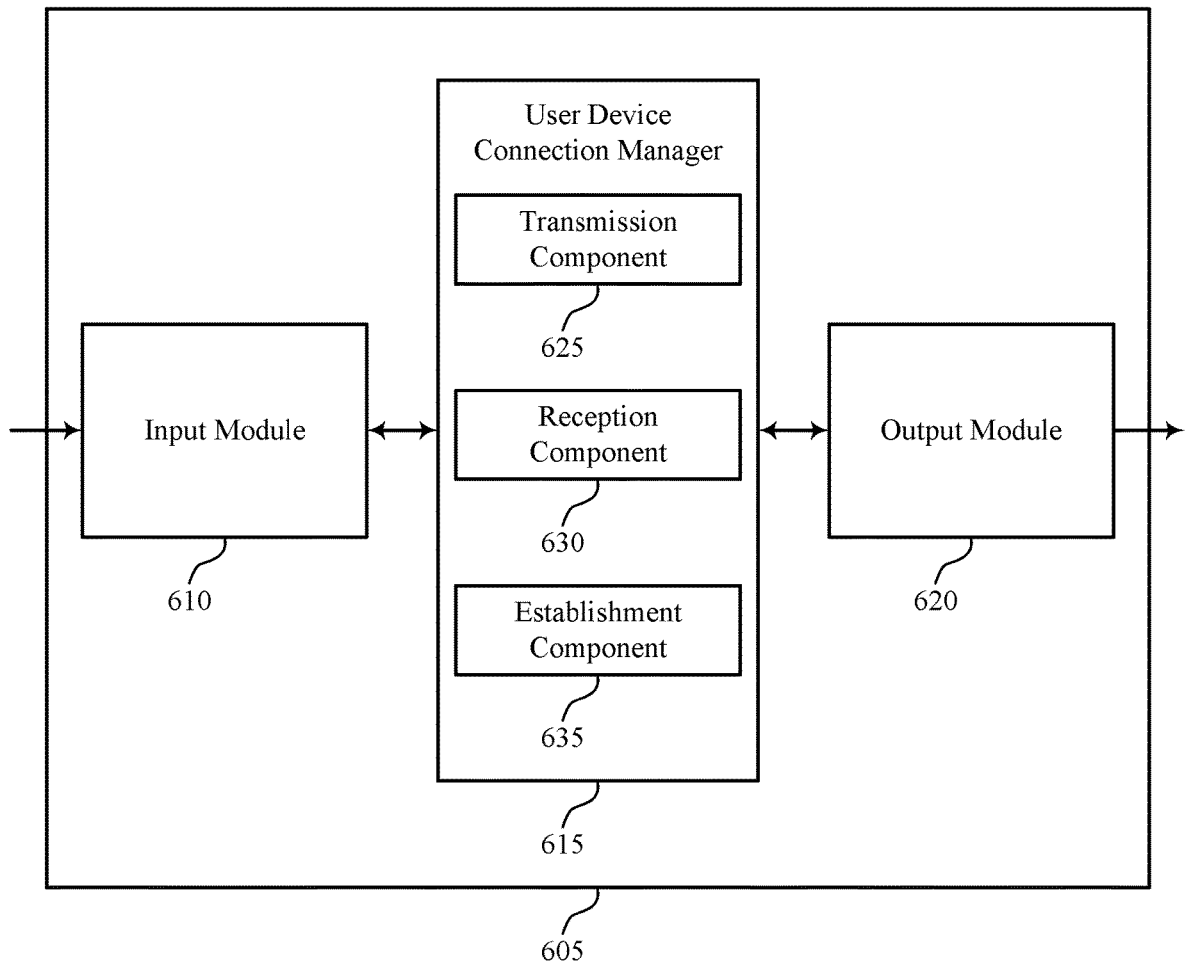
FIGS. 6 and 7 show block diagrams of a device that supports encrypted self-identification using a proxy server in accordance with aspects of the present disclosure.

FIG. 6 shows a block diagram 600 of an apparatus 605 that supports encrypted self-identification using a proxy server in accordance with aspects of the present disclosure. Apparatus 605 may be an example of a user device 205, as described with reference to FIG. 2. Apparatus 605 may include input module 610, user device connection manager 615, and output module 620. Apparatus 605 may also include a processor. Each of these components may be in communication with one another (e.g., via one or more buses). In some cases, apparatus 605 may be an example of a user terminal, a database server, or a system containing multiple computing devices.

User device connection manager 615 may be an example of aspects of the user device connection manager 815 described with reference to FIG. 8. User device connection manager 615 and/or at least some of its various sub-components may be implemented in hardware, software executed by a processor, firmware, or any combination thereof. If implemented in software executed by a processor, the functions of the user device connection manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The user device connection manager 615 and/or at least some of its various sub-components may be physically located at various positions, including being distributed such that portions of functions are implemented at different physical locations by one or more physical devices.

In some examples, user device connection manager 615 and/or at least some of its various sub-components may be a separate and distinct component in accordance with various aspects of the present disclosure. In other examples, user device connection manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

User device connection manager 615 may also include transmission component 625, reception component 630, and establishment component 635.

Transmission component 625 may transmit a query message from the user device (e.g., user device 205 as described with reference to FIG. 2) to a proxy server (e.g., proxy server 210 as described with reference to FIG. 2). In some examples, the query message may include identification information of the user device. In some cases, the identification information of the user device may include an IP address, a TCP, or other communication protocol. In some cases, the query message may include a cryptographic nonce, a timestamp, or both.

Reception component 630 may receive an encrypted message from the proxy server at the user device. In some examples, the encrypted message may include ciphertext corresponding to the identification information of the user device based on an encryption key known to the proxy server and the server.

Transmission component 625 may additionally transmit the encrypted message from the user device to the server (e.g., server 215 as described with reference to FIG. 2). In some examples, the server may be configured to decrypt the encrypted message using the encryption key. In some cases, transmitting the encrypted message may include transmitting a connection request message from the user device to the server. Additionally or alternatively, for example, the connection request message may include the encrypted message located in a header of the connection request message. In some cases, the connection request message may include a HTTP request message. In some cases, transmission component 625 may transmit the encrypted message to one or more additional proxy servers, where each of the one or more additional proxy servers may be configured to transmit the encrypted message to the server.

Establishment component 635 may establish an encrypted connection between the user device (e.g., user device 205 as described with reference to FIG. 2) and the server (e.g., server 215 as described with reference to FIG. 2). In some examples, the encrypted connection may be based on the identification information of the user device. In other examples, establishment component 635 may re-establish the encrypted connection between the user device and the server. Additionally or alternatively, for example, the re-establishment may be based on second identification information of the user device different than the identification information of the user device.

Figure 7:
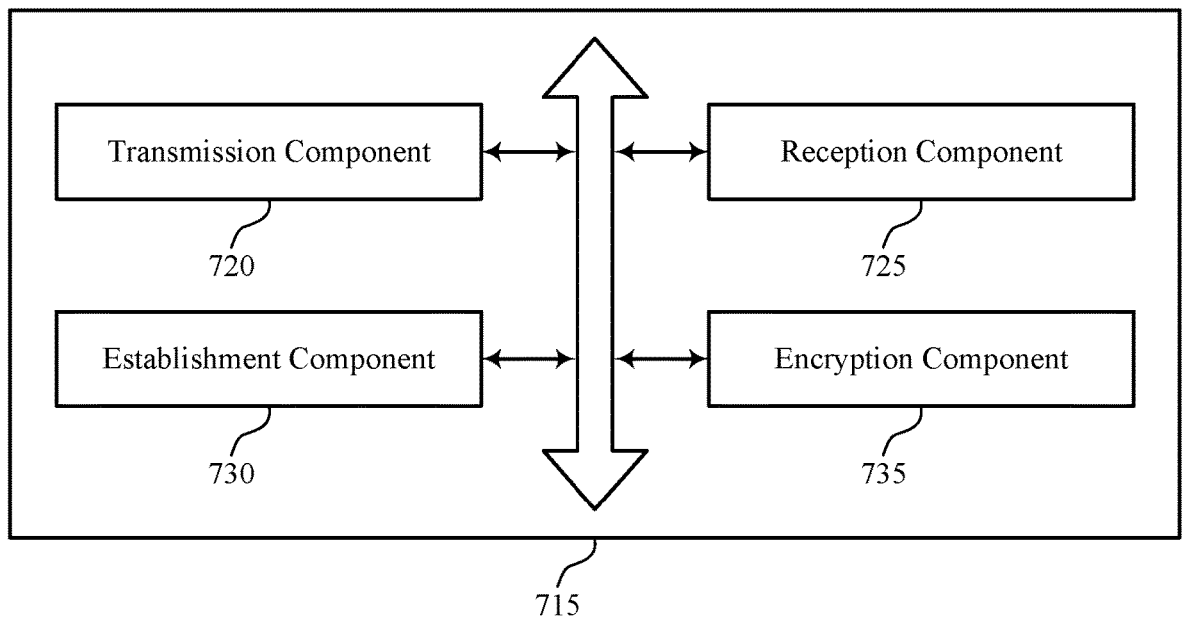

FIG. 7 shows a block diagram 700 of a user device connection manager 715 (e.g., for a user device 205 as described with reference to FIG. 2) that supports encrypted self-identification using a proxy server (e.g., proxy server 210 as described with reference to FIG. 2) in accordance with aspects of the present disclosure. The user device connection manager 715 may be an example of aspects of a user device connection manager 615 or 815 described with reference to FIGS. 6 and 8. The user device connection manager 715 may include transmission component 720, reception component 725, establishment component 730, and encryption component 735. Each of these modules may communicate, directly or indirectly, with one another (e.g., via one or more buses).

Transmission component 720 may transmit a query message from the user device (e.g., user device 205 as described with reference to FIG. 2) to a proxy server. In some examples, the query message may include identification information of the user device. In some cases, the identification information of the user device may include an IP address, a TCP, or other communication protocol. In other examples, the query message may include a cryptographic nonce, a timestamp, or both.

Reception component 725 may receive an encrypted message from the proxy server at the user device. In some examples, the encrypted message may include ciphertext corresponding to the identification information of the user device based on an encryption key known to the proxy server and the server.

Transmission component 720 may additionally transmit the encrypted message from the user device to the server (e.g., server 215 as described with reference to FIG. 2). In some examples, the server may be configured to decrypt the encrypted message using the encryption key. In some cases, transmitting the encrypted message may include transmitting a connection request message from the user device to the server. In some examples, the connection request message may include the encrypted message located in a header of the connection request message. The connection request message may include a HTTP request message. In some cases, the encrypted message may be transmitted to one or more additional proxy servers, and each of the one or more additional proxy servers may be configured to transmit the encrypted message to the server.

Establishment component 730 may establish an encrypted connection between the user device and the server. In some examples, the encrypted connection may be based on the identification information of the user device. In other examples, establishment component 730 may re-establish the encrypted connection between the user device and the server. In some examples, the re-establishment may be based on second identification information of the user device different than the identification information of the user device.

Encryption component 735 may encrypt the connection request message. In some cases, the encrypted message and the encrypted connection request message may be encrypted using different encryption keys. In some examples, the proxy server and the server may have access to an encryption key for the encrypted message. In some cases, the encrypted connection may be established based on the decryption of the encrypted message using the encryption key.

Figure 8:
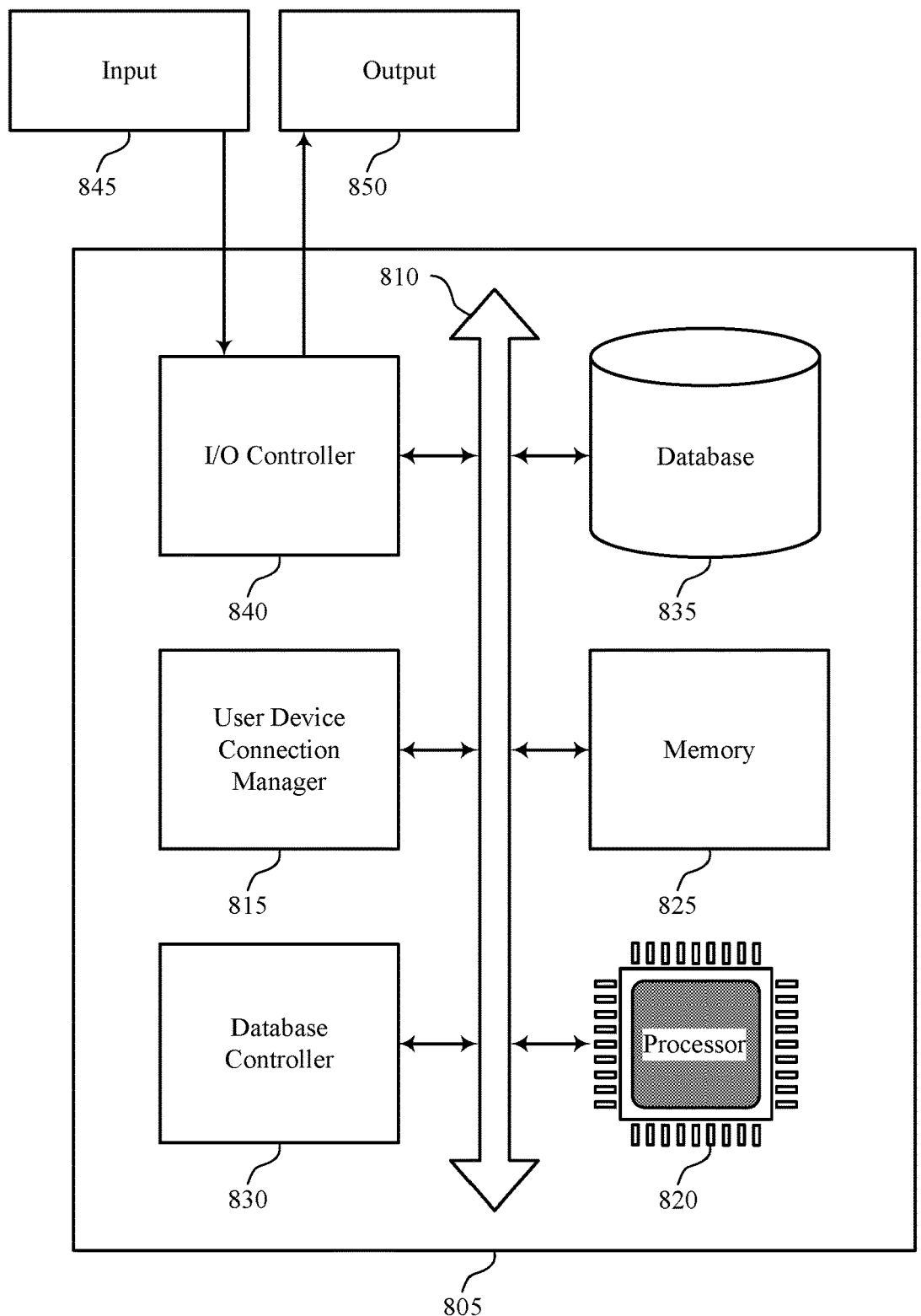
FIG. 8 illustrates a block diagram of a system including a user device that supports encrypted self-identification using a proxy server in accordance with aspects of the present disclosure.

FIG. 8 shows a diagram of a system 800 including a device 805 that supports encrypted self-identification using a proxy server in accordance with aspects of the present disclosure. Device 805 may be an example of or include the components of user device 205 as described above, e.g., with reference to FIG. 2. Device 805 may include components for bi-directional data communications including components for transmitting and receiving communications, including user device connection manager 815, processor 820, memory 825, database controller 830, database 835, and I/O controller 840. These components may be in electronic communication via one or more buses (e.g., bus 810).

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting encrypted self-identification using a proxy server).

Memory 825 may include random access memory (RAM) and read only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

Database controller 830 may manage data storage and processing in database 835. In some cases, a user may interact with database controller 830. In other cases, database controller 830 may operate automatically without user interaction. Database 835 may be an example of a single database, a distributed database, multiple distributed databases, or an emergency backup database.

I/O controller 840 may manage input and output signals for device 805. I/O controller 840 may also manage peripherals not integrated into device 805. In some cases, I/O controller 840 may represent a physical connection or port to an external peripheral. In some cases, I/O controller 840 may utilize an operating system such as iOS®, ANDROID®, MS-DOS®, MS-WINDOWS®, OS/2®, UNIX®, LINUX®, or another known operating system. In other cases, I/O controller 840 may represent or interact with a modem, a keyboard, a mouse, a touchscreen, or a similar device. In some cases, I/O controller 840 may be implemented as part of a processor. In some cases, a user may interact with device 805 via I/O controller 840 or via hardware components controlled by I/O controller 840.

Figure 9:
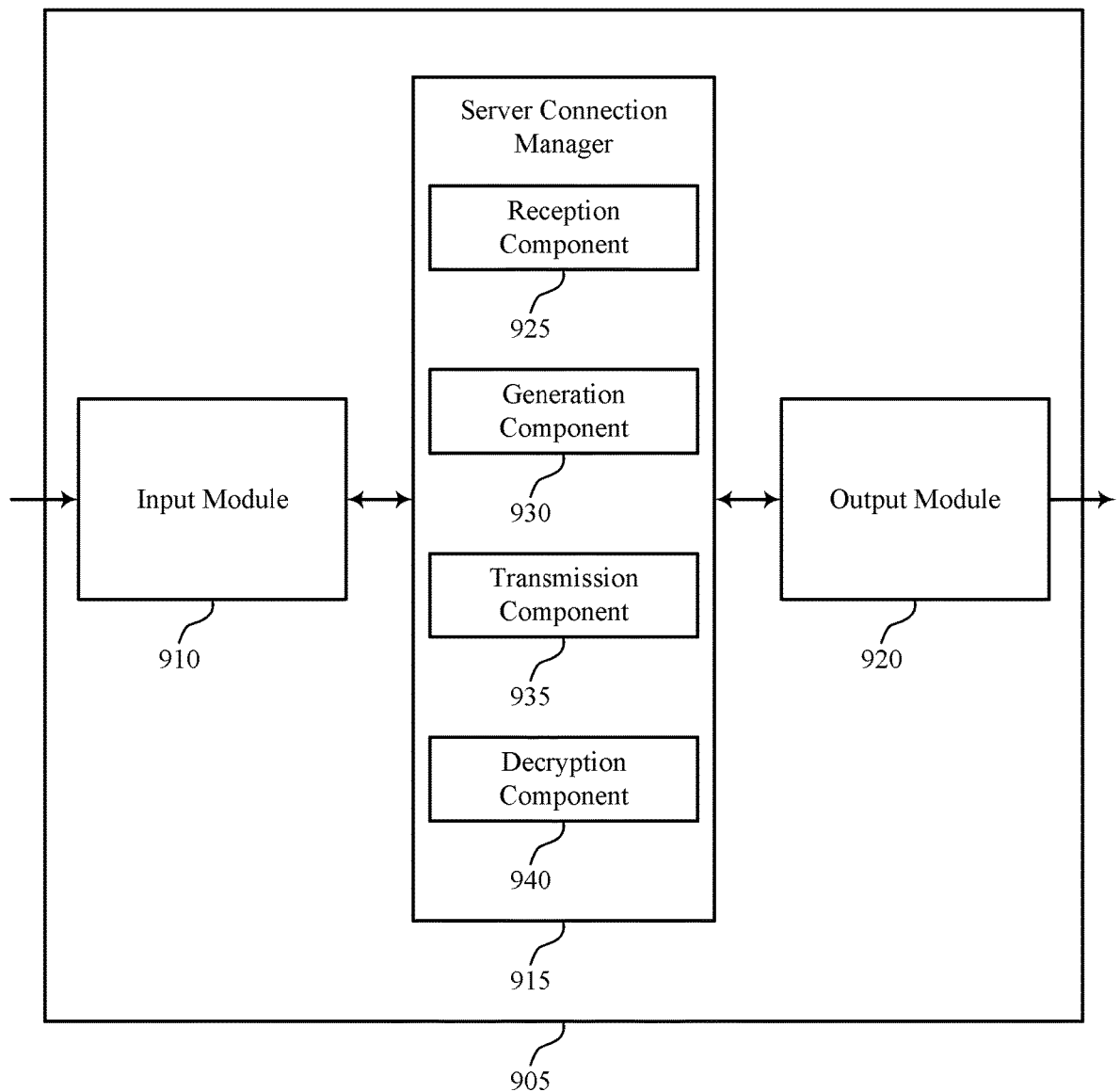
FIGS. 9 and 10 show block diagrams of a device that supports encrypted self-identification using a proxy server in accordance with aspects of the present disclosure.

FIG. 9 shows a block diagram 900 of an apparatus 905 that supports encrypted self-identification using a proxy server (e.g., proxy server 210 as described with reference to FIG. 2) in accordance with aspects of the present disclosure. Apparatus 905 may include input module 910, server connection manager 915, and output module 920. Apparatus 905 may also include a processor. Each of these components may be in communication with one another (e.g., via one or more buses). In some cases, apparatus 905 may be an example of a user terminal, a database server, or a system containing multiple computing devices.

Server connection manager 915 may be an example of aspects of the server connection manager 1115 described with reference to FIG. 11. Server connection manager 915 may also include reception component 925, generation component 930, transmission component 935, and decryption component 940.

Server connection manager 915 and/or at least some of its various sub-components may be implemented in hardware, software executed by a processor, firmware, or any combination thereof. If implemented in software executed by a processor, the functions of the server connection manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The server connection manager 915 and/or at least some of its various sub-components may be physically located at various positions, including being distributed such that portions of functions are implemented at different physical locations by one or more physical devices. In some examples, server connection manager 915 and/or at least some of its various sub-components may be a separate and distinct component in accordance with various aspects of the present disclosure. In other examples, server connection manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Reception component 925 may receive a query message at a proxy server from the user device (e.g., user device 205 as described with reference to FIG. 2). In some examples, the query message may include identification information of the user device. In some cases, the query message may be received from the user device based on the identification information of the user device being a known characteristic.

Generation component 930 may generate an encrypted message by the proxy server using an encryption key known to the proxy server and the server. In some examples, the encrypted message may include ciphertext corresponding to the identification information of the user device. In other examples, generation component 930 may re-generate the encrypted message using the encryption key. In some examples, the encrypted message may be re-generated based on a change in the identification information of the user device. In other examples, generation component 930 may generate the encrypted message using a second encryption key. In some examples, the second encryption key may be different than the encryption key. Transmission component 935 may transmit the encrypted message from the proxy server to the user device.

Reception component 925 may additionally receive the encrypted message from the user device at the server (e.g., server 215 as described with reference to FIG. 2). In some cases, the ciphertext may be located within a header of the encrypted message. Decryption component 940 may decrypt the encrypted message at the server using the encryption key.

Figure 10:
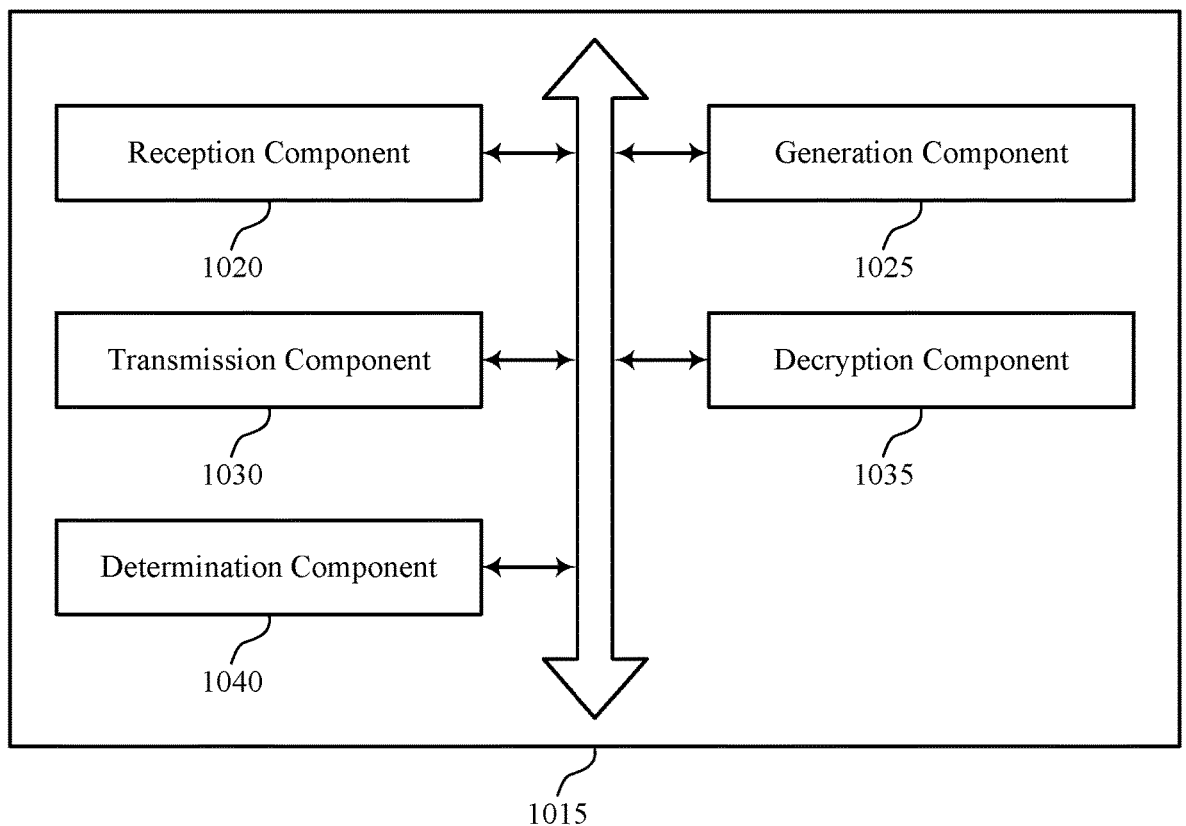

FIG. 10 shows a block diagram 1000 of a server connection manager 1015 that supports encrypted self-identification using a proxy server (e.g., proxy server 210 as described with reference to FIG. 2) in accordance with aspects of the present disclosure. The server connection manager 1015 may be an example of aspects of a server connection manager 915 or 1115 described with reference to FIGS. 9 and 11. The server connection manager 1015 may include reception component 1020, generation component 1025, transmission component 1030, decryption component 1035, and determination component 1040. Each of these modules may communicate, directly or indirectly, with one another (e.g., via one or more buses).

Reception component 1020 may receive a query message at a proxy server from the user device (e.g., user device 205 as described with reference to FIG. 2). In some examples, the query message may include identification information of the user device. In some cases, the query message may be received from the user device based on the identification information of the user device being a known characteristic.

Generation component 1025 may generate an encrypted message by the proxy server using an encryption key known to the proxy server and the server. In some examples, the encrypted message may include ciphertext corresponding to the identification information of the user device. In other examples, generation component 1025 may re-generate the encrypted message using the encryption key. In some examples, the encrypted message may be re-generated based on a change in the identification information of the user device. In other examples, generation component 1025 may generate the encrypted message using a second encryption key. In some examples, the second encryption key may be different than the encryption key. Transmission component 1030 may transmit the encrypted message from the proxy server to the user device.

In some cases, reception component 1020 may additionally receive the encrypted message from the user device at the server (e.g., server 215 as described with reference to FIG. 2). In some cases, the ciphertext may be located within a header of the encrypted message. Decryption component 1035 may decrypt the encrypted message at the server using the encryption key.

Determination component 1040 may determine whether the query message is modified between the user device and the proxy server, where generating the encrypted message is based on the determination.

Figure 11:
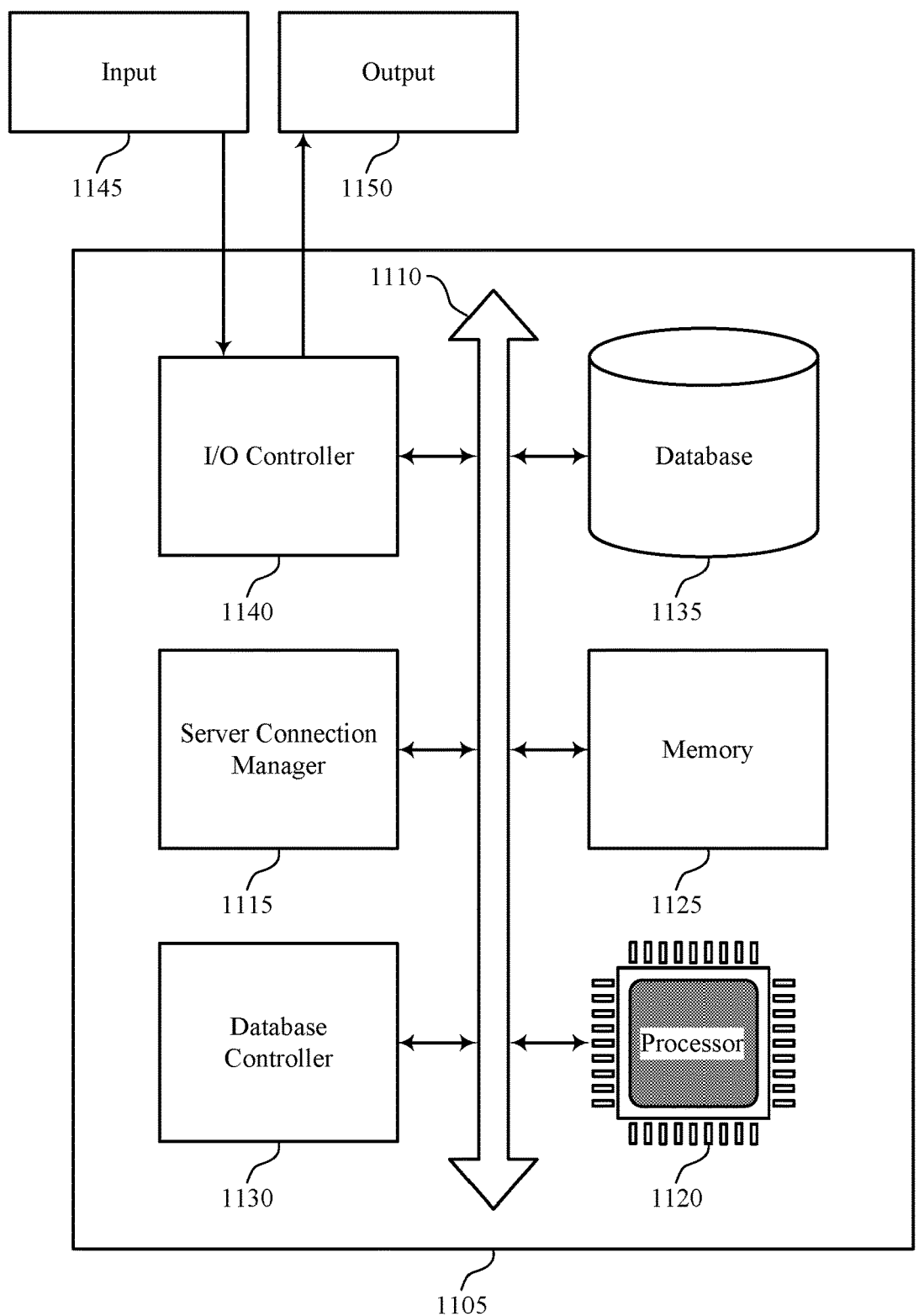
FIG. 11 illustrates a block diagram of a system including a server that supports encrypted self-identification using a proxy server in accordance with aspects of the present disclosure.

FIG. 11 shows a diagram of a system 1100 including a device 1105 that supports encrypted self-identification using a proxy server (e.g., proxy server 210 as described with reference to FIG. 2) in accordance with aspects of the present disclosure. Device 1105 may, in some cases, be an example of or include the components of multiple devices or servers, such as a proxy server 210 and a server 215 as described above, e.g., with reference to FIG. 2. Device 1105 may include components for bi-directional data communications including components for transmitting and receiving communications, including server connection manager 1115, processor 1120, memory 1125, database controller 1130, database 1135, and I/O controller 1140. These components may be in electronic communication via one or more buses (e.g., bus 1110).

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting encrypted self-identification using a proxy server).

Memory 1125 may include RAM and ROM. The memory 1125 may store computer-readable, computer-executable software including instructions that, when executed, cause the processor to perform various functions described herein. In some cases, the memory 1125 may contain, among other things, a BIOS which may control basic hardware or software operation such as the interaction with peripheral components or devices.

Database controller 1130 may manage data storage and processing in database 1135. In some cases, a user may interact with database controller 1130. In other cases, database controller 1130 may operate automatically without user interaction. Database 1135 may be an example of a single database, a distributed database, multiple distributed databases, or an emergency backup database.

I/O controller 1140 may manage input and output signals for device 1105. I/O controller 1140 may also manage peripherals not integrated into device 1105. In some cases, I/O controller 1140 may represent a physical connection or port to an external peripheral. In some cases, I/O controller 1140 may utilize an operating system such as iOS®, ANDROID®, MS-DOS®, MS-WINDOWS®, OS/2®, UNIX®, LINUX®, or another known operating system. In other cases, I/O controller 1140 may represent or interact with a modem, a keyboard, a mouse, a touchscreen, or a similar device. In some cases, I/O controller 1140 may be implemented as part of a processor. In some cases, a user may interact with device 1105 via I/O controller 1140 or via hardware components controlled by I/O controller 1140.

Figure 12:
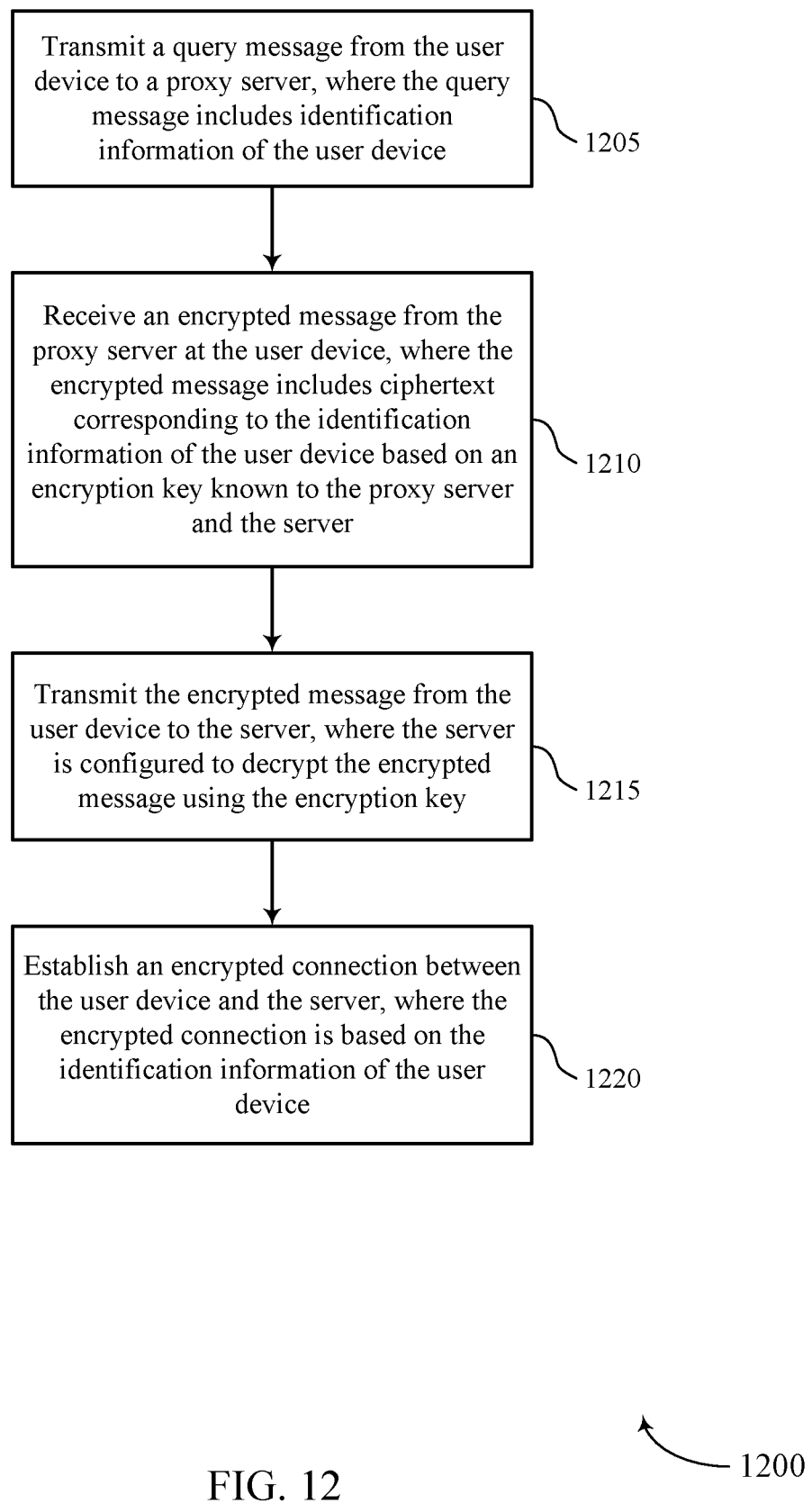
FIGS. 12 and 13 illustrate methods for encrypted self-identification using a proxy server in accordance with aspects of the present disclosure.

FIG. 12 shows a flowchart illustrating a method 1200 for encrypted self-identification using a proxy server in accordance with aspects of the present disclosure. The operations of method 1200 may be implemented by a user device (e.g., user device 205 as described with reference to FIG. 2) or its components as described herein. For example, the operations of method 1200 may be performed by a user device connection manager as described with reference to FIGS. 6 through 8. In some examples, a user device may execute a set of codes to control the functional elements of the device to perform the functions described below. Additionally or alternatively, the user device may perform aspects of the functions described below using special-purpose hardware.

At block 1205 the user device may transmit a query message from the user device to a proxy server. In some examples, the query message may comprise identification information of the user device. The operations of block 1205 may be performed according to the methods described herein. In certain examples, aspects of the operations of block 1205 may be performed by a transmission component as described with reference to FIGS. 6 through 8.

At block 1210 the user device may receive an encrypted message from the proxy server (e.g., proxy server 210 as described with reference to FIG. 2). In some examples, the encrypted message may comprise ciphertext corresponding to the identification information of the user device based on an encryption key known to the proxy server and the server. The operations of block 1210 may be performed according to the methods described herein. In certain examples, aspects of the operations of block 1210 may be performed by a reception component as described with reference to FIGS. 6 through 8.

At block 1215 the user device may transmit the encrypted message from the user device to the server (e.g., server 215 as described with reference to FIG. 2). In some examples, the server is configured to decrypt the encrypted message using the encryption key. The operations of block 1215 may be performed according to the methods described herein. In certain examples, aspects of the operations of block 1215 may be performed by a transmission component as described with reference to FIGS. 6 through 8.

At block 1220 the user device may establish an encrypted connection between the user device and the server. In some examples, the encrypted connection may be based at least in part on the identification information of the user device. The operations of block 1220 may be performed according to the methods described herein. In certain examples, aspects of the operations of block 1220 may be performed by an establishment component as described with reference to FIGS. 6 through 8.

Figure 13:
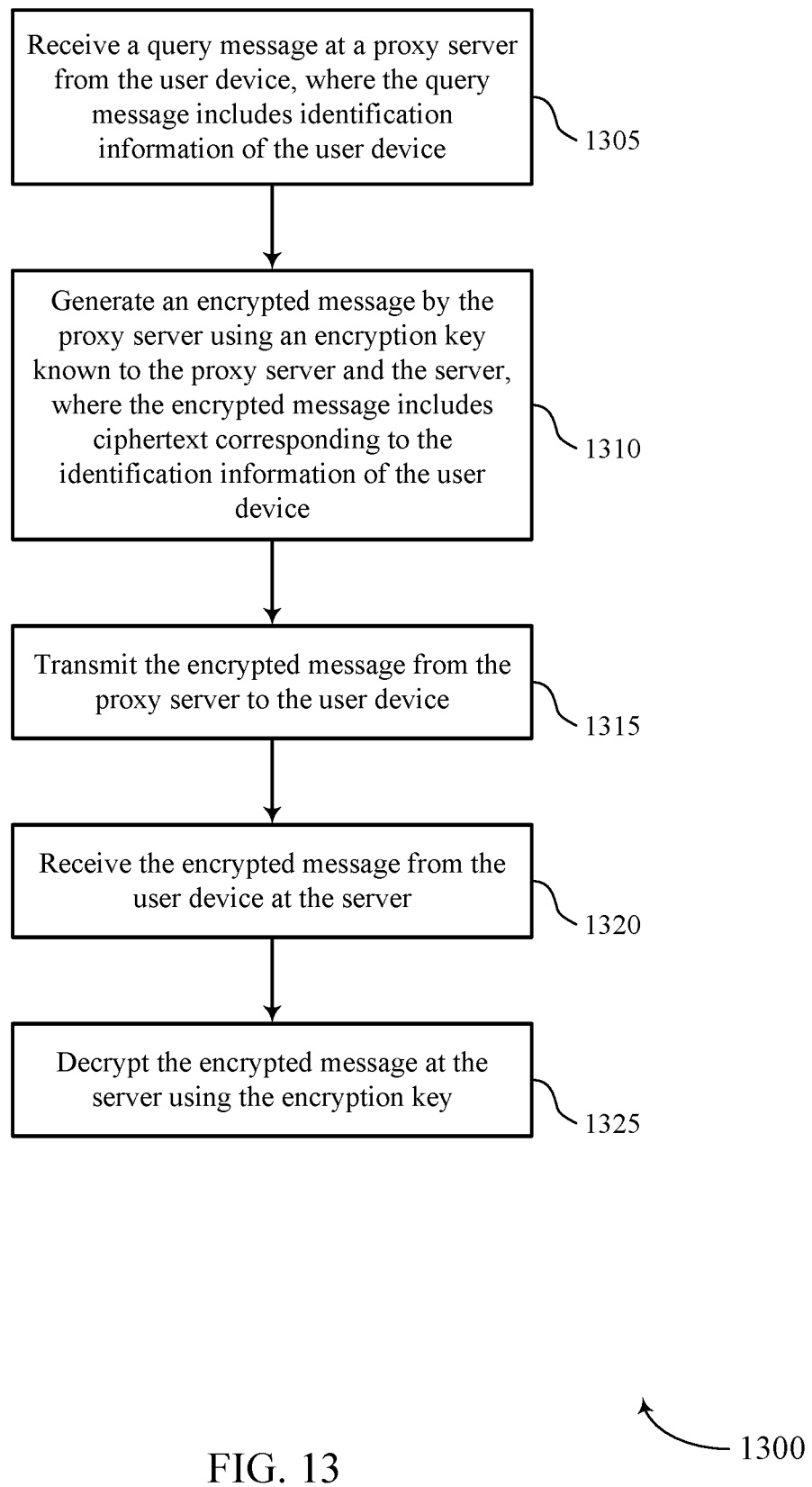

FIG. 13 shows a flowchart illustrating a method 1300 for encrypted self-identification using a proxy server in accordance with aspects of the present disclosure. The operations of method 1300 may be implemented by a server or group of servers (e.g., proxy server 210, server 215, or both, as described with reference to FIG. 2) or its components as described herein. For example, the operations of method 1300 may be performed by a server connection manager as described with reference to FIGS. 9 through 11. In some examples, a server may execute a set of codes to control the functional elements of the device to perform the functions described below. Additionally or alternatively, the server may perform aspects of the functions described below using special-purpose hardware.

At block 1305 the set of servers may receive a query message at a proxy server (e.g., proxy server 210 as described with reference to FIG. 2) from the user device (e.g., user device 205 as described with reference to FIG. 2). In some examples, the query message may comprise identification information of the user device. The operations of block 1305 may be performed according to the methods described herein. In certain examples, aspects of the operations of block 1305 may be performed by a reception component as described with reference to FIGS. 9 through 11.

At block 1310 the set of servers may generate an encrypted message by the proxy server using an encryption key known to the proxy server and the server. In some examples, the encrypted message may comprise ciphertext corresponding to the identification information of the user device. The operations of block 1310 may be performed according to the methods described herein. In certain examples, aspects of the operations of block 1310 may be performed by a generation component as described with reference to FIGS. 9 through 11.

At block 1315 the set of servers may transmit the encrypted message from the proxy server to the user device. The operations of block 1315 may be performed according to the methods described herein. In certain examples, aspects of the operations of block 1315 may be performed by a transmission component as described with reference to FIGS. 9 through 11.

At block 1320 the set of servers may receive the encrypted message from the user device at the server. The operations of block 1320 may be performed according to the methods described herein. In certain examples, aspects of the operations of block 1320 may be performed by a reception component as described with reference to FIGS. 9 through 11.

At block 1325 the set of servers may decrypt the encrypted message at the server using the encryption key. The operations of block 1325 may be performed according to the methods described herein. In certain examples, aspects of the operations of block 1325 may be performed by a decryption component as described with reference to FIGS. 9 through 11.

A method for establishing an encrypted connection is described. In some examples, a method for establishing an encrypted connection between a user device and a server may include transmitting a query message from the user device to a proxy server. In some examples, the query message may comprise identification information of the user device. In other examples, the method may include receiving an encrypted message from the proxy server at the user device, and the encrypted message may comprise ciphertext corresponding to the identification information of the user device based on an encryption key known to the proxy server and the server. In other examples, the method may include transmitting the encrypted message from the user device to the server. In some examples, the server may be configured to decrypt the encrypted message using the encryption key, and establish an encrypted connection between the user device and the server. In some examples, the encrypted connection may be based at least in part on the identification information of the user device.

An apparatus for establishing an encrypted connection between a user device and a server may include a processor, memory in electronic communication with the processor, and instructions stored in the memory. The instructions may be executable to cause the processor to transmit a query message from the user device to a proxy server. In some examples, the query message may comprise identification information of the user device, and receive an encrypted message from the proxy server at the user device. In other examples, the encrypted message may comprise ciphertext corresponding to the identification information of the user device based on an encryption key known to the proxy server and the server, and transmit the encrypted message from the user device to the server. In some examples, the server may be configured to decrypt the encrypted message using the encryption key, and establish an encrypted connection between the user device and the server. In some examples, the encrypted connection may be based at least in part on the identification information of the user device.

In some examples of the method and apparatus described above, transmitting the encrypted message may comprise transmitting a connection request message from the user device to the server. In some examples, the connection request message may comprise the encrypted message located in a header of the connection request message.

In some examples of the method and apparatus described above, the connection request message may comprise a HTTP request message. Some examples of the method and apparatus described above may further include processes, features, means, or instructions for encrypting the connection request message.

In some examples of the method and apparatus described above, the encrypted message and the encrypted connection request message may be encrypted using different encryption keys. In some examples, the proxy server and the server may have access to an encryption key for the encrypted message.

In some examples of the method and apparatus described above, the encrypted message may be transmitted to one or more additional proxy servers. In some examples, each of the one or more additional proxy servers may be configured to transmit the encrypted message to the server.

In some examples of the method and apparatus described above, the identification information of the user device may comprise an IP address, a TCP, or other communication protocol. In some examples of the method and apparatus described above, the encrypted connection may be established based at least in part on the decryption of the encrypted message using the encryption key. In some examples of the method and apparatus described above, the query message may comprise a cryptographic nonce, a timestamp, or both.

Some examples of the method and apparatus described above may further include processes, features, means, or instructions for re-establishing the encrypted connection between the user device and the server, wherein the re-establishment may be based at least in part on second identification information of the user device different than the identification information of the user device.

A method for establishing an encrypted connection between a server and a user device may include receiving a query message at a proxy server from the user device. In some examples, the query message may comprise identification information of the user device. In other examples, the method may include generating an encrypted message by the proxy server using an encryption key known to the proxy server and the server. In some examples, the encrypted message may comprise ciphertext corresponding to the identification information of the user device. Other examples may include transmitting the encrypted message from the proxy server to the user device. Additionally or alternatively for example, some examples may include receiving the encrypted message from the user device at the server, and decrypting the encrypted message at the server using the encryption key.

An apparatus for establishing an encrypted connection between a server and a user device may include a processor, memory in electronic communication with the processor, and instructions stored in the memory. The instructions may be operable to cause the processor to receive a query message at a proxy server from the user device. In some examples, the query message may comprise identification information of the user device, and generate an encrypted message by the proxy server using an encryption key known to the proxy server and the server. In other examples, the encrypted message may comprise ciphertext corresponding to the identification information of the user device. In some examples, the instructions may be operable to transmit the encrypted message from the proxy server to the user device. Additionally or alternatively, for example, the instructions may be operable to receive the encrypted message from the user device at the server, and decrypt the encrypted message at the server using the encryption key.

Some examples of the method and apparatus described above may further include processes, features, means, or instructions for determining whether the query message may be modified between the user device and the proxy server, wherein generating the encrypted message may be based at least in part on the determination. In some examples of the method and apparatus described above, the ciphertext may be located within a header of the encrypted message.

Some examples of the method and apparatus described above may further include processes, features, means, or instructions for re-generating the encrypted message using the encryption key, wherein the encrypted message may be re-generated based at least in part on a change in the identification information of the user device. Some examples of the method and apparatus described above may further include processes, features, means, or instructions for generating the encrypted message using a second encryption key, wherein the second encryption key may be different than the encryption key.

In some examples of the method and apparatus described above, the query message may be received from the user device based at least in part on the identification information of the user device being a known characteristic.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for establishing an encrypted connection between a user device and a server, comprising:
   transmitting a query message from the user device to a proxy server, wherein the query message comprises identification information of the user device, wherein the identification information of the user device comprises an Internet Protocol (IP) address, a Transmission Control Protocol (TCP), or other communication protocol;
   receiving an encrypted message from the proxy server at the user device, wherein the encrypted message comprises ciphertext corresponding to the identification information of the user device based on an encryption key that is known to the proxy server and the server;
   transmitting the encrypted message from the user device to the server, wherein the server is configured to decrypt the encrypted message using the encryption key;
   establishing an encrypted connection between the user device and the server, wherein the encrypted connection is based at least in part on the identification information of the user device; and
   re-establishing the encrypted connection between the user device and the server using a re-generated encryption key based at least in part on second identification information of the user device different than the identification information of the user device.

2. The method of claim 1, wherein transmitting the encrypted message comprises:
transmitting a connection request message from the user device to the server, wherein the connection request message comprises the encrypted message located in a header of the connection request message, and wherein the encrypted connection is established based at least in part on a comparison between the identification information of the user device in the encrypted message and identification information for an originator of the connection request message.

3. The method of claim 2, wherein the connection request message comprises a Hypertext Transfer Protocol (HTTP) request message.

4. The method of claim 2, further comprising:
encrypting the connection request message.

5. The method of claim 4, wherein the encrypted message and the encrypted connection request message are encrypted using different encryption keys, wherein the proxy server and the server have access to an encryption key for the encrypted connection request message.

6. The method of claim 1, wherein the encrypted message is transmitted to one or more additional proxy servers, wherein each of the one or more additional proxy servers is configured to transmit the encrypted message to the server.

7. The method of claim 1, wherein the encrypted connection is established based at least in part on the decryption of the encrypted message using the encryption key.

8. The method of claim 1, wherein the query message comprises a cryptographic nonce, a timestamp, or both.

9. The method of claim 1, further comprising:
re-generating the encrypted message using the encryption key, wherein the encrypted message is re-generated based at least in part on a change in the identification information of the user device.

10. A method for establishing an encrypted connection between a server and a user device, comprising:
receiving a query message at a proxy server from the user device, wherein the query message comprises identification information of the user device, wherein the identification information of the user device comprises an Internet Protocol (IP) address, a Transmission Control Protocol (TCP), or other communication protocol;
generating an encrypted message by the proxy server using an encryption key that is known to the proxy server and the server wherein the encrypted message comprises ciphertext corresponding to the identification information of the user device;
transmitting the encrypted message from the proxy server to the user device;
receiving the encrypted message from the user device at the server;
decrypting the encrypted message at the server using the encryption key; and
re-generating the encrypted message using a regenerated encryption key based at least in part on a change in the identification information of the user device.

11. The method of claim 10, further comprising:
determining whether the query message is modified between the user device and the proxy server, wherein generating the encrypted message is based at least in part on the determination.

12. The method of claim 10, wherein the ciphertext is located within a header of the encrypted message.

13. The method of claim 10, further comprising:
re-generating the encrypted message using the encryption key, wherein the encrypted message is re-generated based at least in part on a change in the identification information of the user device.

14. The method of claim 13, further comprising:
generating the encrypted message using a second encryption key, wherein the second encryption key is different than the encryption key.

15. The method of claim 10, wherein the query message is received from the user device based at least in part on the identification information of the user device being a known characteristic.

16. The method of claim 10, wherein receiving the encrypted message comprises:
receiving a connection request message from the user device at the server, wherein the connection request message comprises the encrypted message located in a header of the connection request message, the method further comprising:
establishing an encrypted connection between the user device and the server based at least in part on a comparison between the identification information of the user device in the encrypted message and identification information for an originator of the connection request message.

17. An apparatus for establishing an encrypted connection between a user device and a server, comprising:
a processor;
memory in electronic communication with the processor; and
instructions stored in the memory and operable, when executed by the processor, to cause the apparatus to:
transmit a query message from the user device to a proxy server, wherein the query message comprises identification information of the user device, wherein the identification information of the user device comprises an Internet Protocol (IP) address, a Transmission Control Protocol (TCP), or other communication protocol;
receive an encrypted message from the proxy server at the user device, wherein the encrypted message comprises ciphertext corresponding to the identification information of the user device based on an encryption key that is known to the proxy server and the server;
transmit the encrypted message from the user device to the server, wherein the server is configured to decrypt the encrypted message using the encryption key;
establish an encrypted connection between the user device and the server, wherein the encrypted connection is based at least in part on the identification information of the user device; and
re-establish the encrypted connection between the user device and the server using a regenerated encryption key based at least in part on second identification information of the user device different than the identification information of the user device.

18. The apparatus of claim 17, wherein the instruction stored in the memory operable to cause the apparatus to transmit the encrypted message comprise instructions operable to cause the apparatus to:
transmit a connection request message from the user device to the server, wherein the connection request message comprises the encrypted message located in a header of the connection request message, and wherein the encrypted connection is established based at least in part on a comparison between the identification information of the user device in the encrypted message and identification information for an originator of the connection request message.

19. An apparatus for establishing an encrypted connection between a server and a user device, comprising:
   a processor;
   memory in electronic communication with the processor; and
   instructions stored in the memory and operable, when executed by the processor, to cause the apparatus to:
      receive a query message at a proxy server from the user device, wherein the query message comprises identification information of the user device, wherein the identification information of the user device comprises an Internet Protocol (IP) address, a Transmission Control Protocol (TCP), or other communication protocol;
      generate an encrypted message by the proxy server using an encryption key that is known to the proxy server and the server, wherein the encrypted message comprises ciphertext corresponding to the identification information of the user device;
      transmit the encrypted message from the proxy server to the user device;
      receive the encrypted message from the user device at the server;
      decrypt the encrypted message at the server using the encryption key; and
      re-generate the encrypted message using a regenerated encryption key based at least in part on a change in the identification information of the user device.

* * * * *